United States Patent
Fagundes (10) Patent No.: US 10,924,894 B2
(45) Date of Patent: Feb. 16, 2021

(54) SYSTEM AND METHOD FOR SENDING AND RECEIVING NON-VISUAL MESSAGES IN AN ELECTRONIC AUDIO COMMUNICATION SESSION

(71) Applicant: Avaya Inc., Santa Clara, CA (US)

(72) Inventor: Luciano Godoy Fagundes, São Paulo (BR)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/137,427

(22) Filed: Sep. 20, 2018

(65) Prior Publication Data
US 2020/0100072 A1 Mar. 26, 2020

(51) Int. Cl.
*H04W 4/16* (2009.01)
*H04W 4/12* (2009.01)
*H04L 12/58* (2006.01)

(52) U.S. Cl.
CPC .............. *H04W 4/12* (2013.01); *H04L 51/10* (2013.01); *H04W 4/16* (2013.01)

(58) Field of Classification Search
CPC ........ H04W 4/12; H04W 4/16; H04L 65/403; H04L 51/10; H04L 51/02; H04N 7/15; H04M 3/5183; H04M 3/5175; H04M 3/568; H04M 65/403; H04M 2203/40; H04M 2203/353; H04M 2203/352; H04M 3/56
See application file for complete search history.

(56) References Cited

U.S. PATENT DOCUMENTS

| 6,807,563 | B1* | 10/2004 | Christofferson | H04L 12/1822 709/204 |
| 6,888,935 | B1* | 5/2005 | Day | H04L 29/06027 370/260 |
| 8,767,035 | B2* | 7/2014 | Baldwin | H04N 7/152 348/14.03 |
| 2002/0172342 | A1* | 11/2002 | O'Malley | H04M 3/56 379/202.01 |
| 2011/0169908 | A1* | 7/2011 | Lee | H04M 1/72547 348/14.02 |
| 2013/0006622 | A1* | 1/2013 | Khalil | G10L 19/012 704/233 |
| 2013/0141516 | A1* | 6/2013 | Baldwin | H04N 7/152 348/14.03 |

(Continued)

OTHER PUBLICATIONS

Rosenberg et al. "SIP: Session Initiation Protocol," Network Working Group, Ju. 2002, RFC 3261, 269 pages.

*Primary Examiner* — Marcus Hammonds
(74) *Attorney, Agent, or Firm* — Sheridan Ross P.C.

(57) ABSTRACT

An automated non-visual user message is sent to a first communication endpoint during an audio communication session. The audio communication session is between a first user of the first communication endpoint and a second user of a second communication endpoint. For example, the automated non-visual message may be made using an audible whisper mode or using a vibrator. A response to the automated non-visual user message is received. The response to the automated non-visual user message is based on at least one of: an accelerometer event in the first communication device and a spoken word or phrase that is said by the first user of the first communication endpoint during the audio communication session with a second user of the second communication endpoint.

18 Claims, 4 Drawing Sheets

(56) References Cited

U.S. PATENT DOCUMENTS

| | | | |
|---|---|---|---|
| 2014/0256298 A1* | 9/2014 | Moss | H04W 4/12 |
| | | | 455/414.1 |
| 2014/0369483 A1* | 12/2014 | Lovitt | G06F 3/017 |
| | | | 379/202.01 |
| 2015/0222586 A1 | 8/2015 | Ebersman et al. | |
| 2017/0352361 A1 | 12/2017 | Thorn | |
| 2018/0234550 A1* | 8/2018 | Lifson | H04L 69/08 |

* cited by examiner

SYSTEM AND METHOD FOR SENDING AND RECEIVING NON-VISUAL MESSAGES IN AN ELECTRONIC AUDIO COMMUNICATION SESSION

FIELD

The disclosure relates generally to electronic voice communication sessions and particularly to providing commands during the electronic voice communication sessions to a user.

BACKGROUND

In today's contact centers, some of the contact center agents are becoming mobile. For example, a new type of contact center agent is a field agent. Field agents are not like traditional remote agent clients that allow contact center agents to work remotely. Traditional contact center tools assume that remote agents will have the exact same roles and devices that they would have if they were working at the company's contact center. Field agents are business people whose main jobs are assisting customers in person. They are usually inside a physical branch or in separated offices. The field agent's primary role is not assisting contact center customers; however, in today's environment, the field agent's role may include assisting customers of a contact center.

As a result of being mobile, the field agent is typically limited to a hand-held mobile device, such as a smartphone. During a communication session, the field agent's screen is not visible because the smartphone will held up to the field agent ear. This results in the field agent not being able to receive traditional visual messages that a regular contact center agent receives. In addition, because of the limited size of the smartphone, the field agent's ability to send and receive commands is dramatically limited in comparison to a traditional contact center agent.

SUMMARY

These and other needs are addressed by the various embodiments and configurations of the present disclosure. An automated non-visual user message is sent to a first communication endpoint during an audio communication session. The audio communication session is between a first user of the first communication endpoint and a second user of a second communication endpoint. For example, the automated non-visual message may be made using an audible whisper mode or using a vibrator. A response to the automated non-visual user message is received. The response to the automated non-visual user message is based on at least one of: an accelerometer event in the first communication device and a spoken word or phrase that is said by the first user of the first communication endpoint during the audio communication session with a second user of the second communication endpoint.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "audio communication session" as defined herein may include an audio only communication session or a video communication session that has an audio signal, such as a video call, a multimedia session, a virtual reality session, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
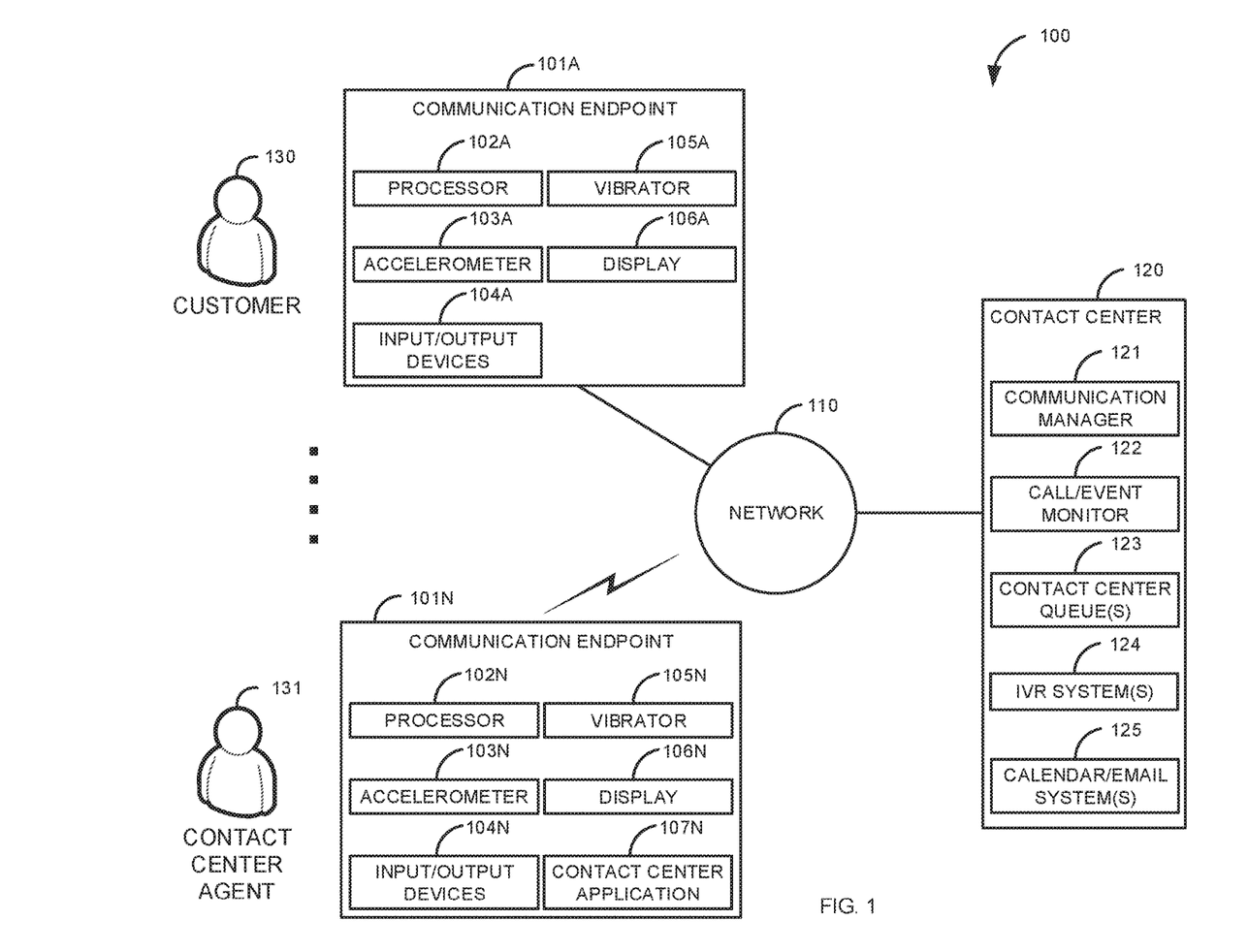
FIG. 1 is a block diagram of a first illustrative system for sending and receiving non-visual messages in an electronic audio communication session.

FIG. 1 is a block diagram of a first illustrative system 100 for sending and receiving non-visual messages in an electronic audio communication session. The first illustrative system 100 comprises communication endpoints 101A-101N, a network 110, and a contact center 120. In FIG. 1, the communication endpoint 101A is used by a customer 130. The communication endpoint 101N is shown as being used by contact center agent 131. Although not shown, additional customers 130/contact center agents 131 may connect with each other via the contact center 120 by using additional communication endpoints 101.

The communication endpoints 101A-101N can be or may include any communication endpoint device that can communicate on the network 110, such as a Personal Computer (PC), a telephone, a video system, a cellular telephone, a Personal Digital Assistant (PDA), a tablet device, a notebook device, a smartphone, and/or the like. The communication endpoints 101A-101N are devices where a communication sessions ends. The communication endpoints 101A-101N are not network elements that facilitate and/or relay a communication session in the network, such as a communication manager 121 or router. As shown in FIG. 1, any number of communication endpoints 101A-101N may be connected to the network 110.

The communication endpoint 101A further comprises a processor 102A, an accelerometer 103A, input/output devices 104A, a vibrator 105A, and a display 106A. In FIG. 1, the communication endpoint 101A is shown as a wired communication endpoint and communication endpoint 101N is shown as a wireless communication endpoint. However, any of the communication endpoints 101A-101N may be wired or wireless.

The processor 102A can be or may include any hardware processor, such as a microprocessor, a multi-core processor, an application specific processor, a micro controller, and/or the like.

The accelerometer 103A can be or may include any hardware device that can detect movement of the communication endpoint 101A. The accelerometer 103A can detect movement in different directions, at various speeds, and in various patterns, such as shaking and/or periodically shaking the mobile device 101A in different directions.

The input/output devices 104A can be or may include various hardware elements, such as, a microphone, a speaker, a touch screen, a mouse, a trackball, a display 106, a keyboard, a virtual keyboard, and/or the like. The input/output devices 104A allow the customer 130 to provide and receive information to/from the communication endpoint 101A.

The vibrator 105A can be or may include any hardware element that can vibrate the communication endpoint 101A. The vibrator 105A can vibrate in various ways, such as a single time, in a pattern or sequence, at one or more defined levels, and/or the like.

The display 106A can be or may include any hardware element that can display information to the customer 130, such as, a touch screen, a Light Emitting Diode (LED) display, a plasma display, a lamp, a LED, a Liquid Crystal Display (LCD), and/or the like.

In one embodiment, the communication endpoint 101A may not include all the elements 102A-106A. For example, the communication endpoint 101A may not have the accelerometer 103A/vibrator 105A because the communication endpoint 101A is a desktop computer.

The communication endpoint 101N includes a processor 102N, an accelerometer 103N, input/output devices 104N, a vibrator 105N, a display 106N, and a contact center application 107N. The processor 102N, the accelerometer 103N, the input/output devices 104N, the vibrator 105N, and the display 106N can be the same or similar to the same elements in the communication endpoint 101A.

The contact center application 107N can be or may include any application that can communicate with the contact center 120. For example, the contact center application 107N can be used to manage a communication session that has been established, via the contact center 120, with the communication endpoint 101A of the customer 130.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), H.323, video protocols, wireless protocols, Integrated Services Digital Network (ISDN), and/or the like. Thus, the network 110 is an electronic communication network configured to carry messages via packets and/or circuit switched communications.

The contact center 120 can be or may include any hardware coupled with software that can manage and route communication sessions from the communication endpoints 101A-101N. For example, the contact center 120 may route a communication session between from the communication endpoint 101A (from the customer 130) to the communication endpoint 101N (with the contact center agent 131). The types of communications managed and routed by the contact center 120 may include voice, video, email, text, Instant Messaging (IM), virtual reality, multimedia, and/or the like.

The contact center 120 comprises a communication manager 121, a call/event monitor 122, contact center queue(s) 123, Interactive Voice Response (IVR) system(s), and calendar/email system(s) 125. The communication manager 121 can be or may include any hardware system that can route communication sessions in the contact center 120, such as a switch, a Private Branch Exchange (PBX), a central office switch, a proxy server, a router, and/or the like. The communication manager 121 can route a variety of communication sessions, such as voice, video, email, text, IM, virtual reality, multimedia, and/or the like.

The call/event monitor 122 can be or may include any hardware coupled with software that can detect events and monitor a communication session. For example, the call/event monitor 122 may receive/detect events from the communication manager 121, the contact center queue(s) 123, the IVR system(s) 124, the calendar/email system(s) 125, the accelerometer 103, the input/output devices 104, the processor 102, or other systems, such as a scanner, a barcode reader, a sensor, voice/text of a communication session, and/or the like.

The contact center queue(s) 123 can be or may include any computer construct that can hold communication sessions. For example, the contact center queue(s) 123 may hold voice calls that are eventually transferred to the communication endpoint 101N of a contact center agent 131. In one embodiment, the contact center queue(s) 123 may work as a pool of held communication sessions. The held communication sessions in the contact center queue(s) 123 may be of different types. For example, the same contact center queue 123 may hold voice, video, and email communication sessions.

The IVR system(s) 124 can be or may include any hardware coupled with software that can audibly interact with a customer 130. The IVR system(s) 124 can provide a series of menus that provide instructions that are used for routing communication sessions in the contact center 120.

The calendar/email system(s) 125 can be or may include any hardware coupled with software that can manage calendars/emails for the contact center agent 131 (or typically a number of contact center agents 131). The calendar/email system(s) 125 may work in conjunction with the communication manager 121/contact center queue(s) 123 to route emails in the contact center 120.

Figure 2:
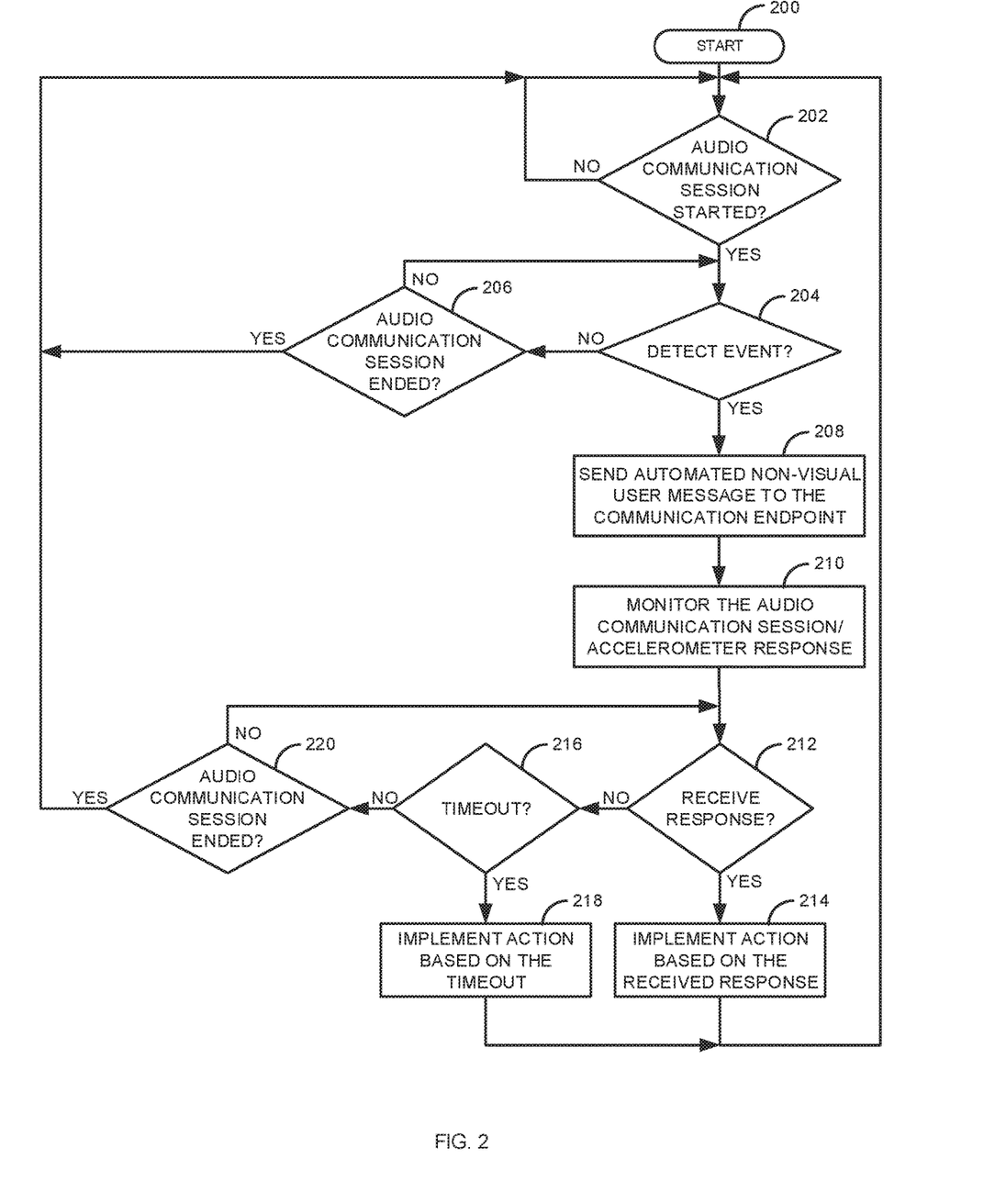
FIG. 2 is a flow diagram of a process for sending and receiving non-visual messages in an electronic audio communication session.
Figure 3:
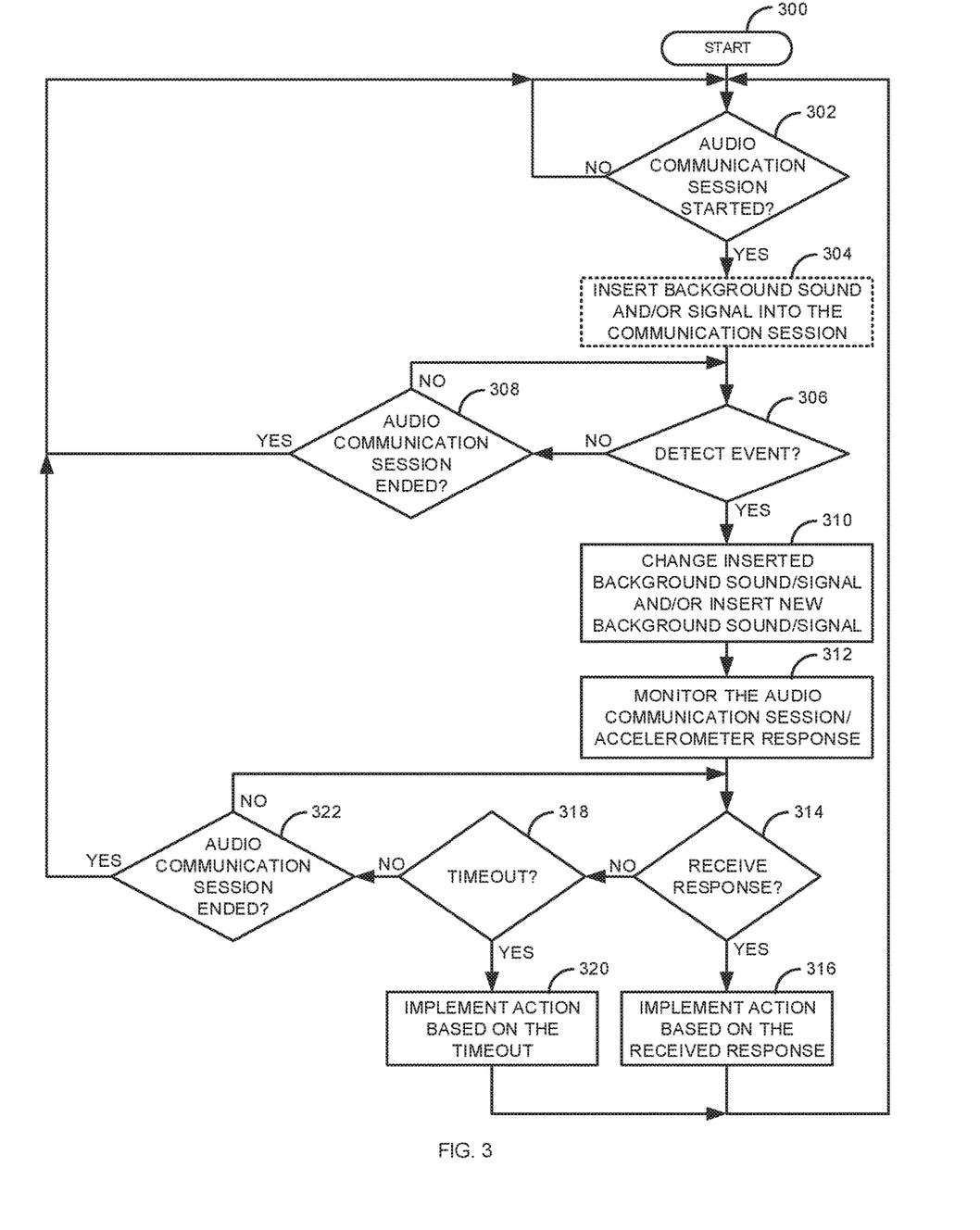
FIG. 3 is a flow diagram of a process for sending and receiving non-visual messages in an electronic audio communication session using background sounds/signals.
Figure 4:
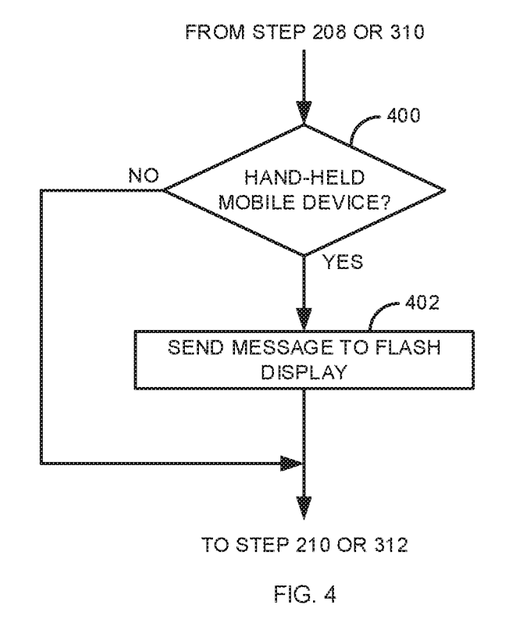
FIG. 4 is a flow diagram of a process for flashing a display of a hand-held mobile device to convey a message when the hand-held mobile device is being held to a user's ear.

FIG. 2 is a flow diagram of a process for sending and receiving non-visual messages in an electronic audio communication session. Illustratively, the communication endpoints 101A-101N, the contact center application 107N, the contact center 120, the communication manager 121, the call/event monitor 122, the contact center queue(s) 123, the IVR system(s) 124, and the calendar/email system(s) 125 are stored-program-controlled entities, such as a computer or microprocessor, which performs the method of FIGS. 2-4 and the processes described herein by executing program instructions stored in a computer readable storage medium, such as a memory (i.e., a computer memory, a hard disk, and/or the like). Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process of FIG. 2 is illustratively described where an audio communication session is eventually established between the communication endpoint 101A of the customer 130 and the communication endpoint 101N of the contact center agent 131 via the contact center 120. However, the process of FIG. 2 is not limited to a single audio communication session. For example, the process of FIG. 2 may work with multiple concurrent audio communication sessions, conferenced audio communication sessions, and/or the like between multiple customers 130/contact center agents 131.

The process starts in step 200. The call/event monitor 122 determines, in step 202, if an audio communication session has started/is established. For example, the call/event monitor 122 can determine (e.g., based on a message received from the communication manager 121) that an audio communication session has been established between the communication endpoint 101A of the customer 130 and the communication endpoint 101N of the contact center agent 131. If the audio communication session has not started/been established in step 202, the process of step 202 repeats.

Otherwise, if the audio communication session has started/been established in step 202, the call/event monitor 122 waits to detect an event in step 204. The event of step 204 may be any event that relates to the audio communication session between the communication endpoint 101A of the customer 130 and the communication endpoint 101N of the contact center agent 131. The event may be based on any party in the audio communication session, based on any event of the contact center 120 (e.g., a call volume), based on outside events (e.g., a natural disaster), and/or the like. In one embodiment, the detected event in step 204 may occur before the audio communication session is actually established. For example, the event may be that the contact center 120 is having an increased call volume. The event may be based on one or more rules that can be predefined, administered, learned using Artificial Intelligence (AI), and/or the like.

The event of step 204 may be based on one or more contact center queue(s) 123. For example, when the contact center queue 123 is holding more than a defined number of calls, an event may be generated. In another embodiment, an estimated call wait time (for a new call) may be the detected event.

In one embodiment, a calendar event is detected in step 204. For example, the event may be where the contact center agent 131 has an upcoming break, is at the end of his/her work period, has a secluded meeting, has a schedule task, and/or the like.

The event may be to escalate the audio communication session to a supervisor or technical expert based on one or more factors. For example, the call/event manager 122 may determine that the voice of the contact center agent 131 and/or customer 130 is becoming agitated (e.g., by detecting profanity and/or voice stress/inflection) or the call is taking too long and generate an event to notify the contact center agent 131 that the call needs to be transferred to a supervisor or technical expert. Alternatively, the event may be to conference in a supervisor/technical expert based on various factors.

The event may be to transfer the audio communication session to an Interactive Voice Response (IVR) system 124 to better serve the customer 130. For example, the call/event manager 122 may determine that the current contact center agent 131 does not support the product the customer 130 is inquiring about and needs to transfer the call to an IVR system 124 that queries the customer about the correct product.

The event may be where it is determined that the contact center agent 131 needs to send a document to the customer 130. For example, the call/event manager 122 may determine by listening to the voice conversation that the customer 130 needs a copy of a user manual. A response to the event may include sending an email with the manual as an attachment to the customer 130.

The event may be to play contents of a previous email that was sent to the contact center agent 131. For example, the call/event manager 122 may use a whisper channel (where only the contact center agent 131 hears the message) that plays the contents of a previous email sent by the customer 130 so that the contact center agent 131 can better understand the customer's problem.

If an event is not detected in step 204, the call/event manager 122 determines if the audio communication session has ended in step 206. If the audio communication has ended in step 206, the process goes back to step 202. Otherwise, if the audio communication session has not ended in step 206, the process goes back to step 204 to detect an event.

If an event is detected in step 204, the call/event manager 122 automatically sends, in step 208, a non-visual user message to the communication endpoint 101N of the contact center agent 131 involved in the audio communication session. For example, the non-visual user message may be sent by the call/event manager 122 to have the vibrator 105N vibrate, vibrate in a defined pattern, vibrate a one or more defined levels, and/or the like in the communication endpoint 101N during the audio communication session. The vibration conveys an automated non-visual user message to the contact center agent 131. Alternatively, the non-visual user message may be sent via the whisper channel that plays an audio message (e.g., a voice message) to the contact center agent 131 that only the contact center agent 131 hears.

In one embodiment, the non-visual user message of step 208 may be in the form of a sound (i.e., the message is not conveyed by words). For example, the automated non-visual user message may be in the form of changing a song in a music stream to a different song, changing a genre of music in the music steam (e.g., changing from classical music to rock and roll based on a mood of the customer 130), repeating the same song in the music stream (e.g., to indicate that the mood of the customer 130 is still good), a specific sound, a removed sound, a changed heartbeat sound, a beep, a series of beeps, a changed frequency of the heartbeat sound, a changed level of white noise, a changed sound level, and/or the like. These messages may be sent using the whisper channel to the contact center agent 131.

The call/event manager 122 monitors the audio communication session between the communication endpoint 101A of the customer 130 and the communication endpoint 101N of the contact center agent 131 in step 210. For example, the call/event manager 122 may detect a word or phrase spoken by the contact center agent 131 in the audio communication session between the communication endpoint 101A of the customer 130 and the communication endpoint 101N of the contact center agent 131. The automated non-visual message of step 208 may be sent via the whisper channel that says "say transfer in next 30 seconds to indicate that you want transfer this call to a supervisor." The contact center agent 131 can then say to the customer 130 "I am going to transfer you to my supervisor." Upon detecting the word "transfer," the call/event monitor 122 asks (if an option), via the whisper channel, the contact center agent 131 of he/she wants the call transferred. The contact center agent 131 can then respond by saying "yes," by pushing a button, and/or the like.

Alternatively, the call/event manager 122 can detect a response based on the accelerometer 103N. For example, the automated non-verbal user message may indicate that a call wait time for the contact center queue 123 has exceeded a threshold and asks the contact center agent 131 to handle the call as quickly as possible. The automated non-verbal user message indicates that the contact center agent 131 can then shake the communication endpoint 101N to acknowledge the automated non-verbal user message. When the contact center agent 131 shakes the communication endpoint 101N, the contact center application 107N sends a message that the communication endpoint 101N was shaken. Alternatively, the contact center agent 131 may shake the communication endpoint 101N to provide different responses. For example, shaking the communication endpoint 101N once may indicate to implement a first action (e.g., to transfer the audio communication session to an IVR system 124) and shaking the communication endpoint 101N two times may indicate to implement a second action (e.g., conference a supervisor onto the audio communication session).

The call/event manager 122 determines, in step 212, if a response to the automated non-verbal user message has been received. If a response is received in step 212, an action is implemented (if there is one) based on the received response in step 214. For example as discussed above, the response may be to transfer the audio communication session to a supervisor. In some embodiments, step 214 may not exist. For example, as discussed above, the response may be only to acknowledge the automated non-verbal user message and there is no action based on the response. After implementing the action based on the received response in step 214, the process goes to step 202.

Otherwise, if a response is not received, in step 212, the call/event manager 122 determines if a timeout period has been met in step 216. For example, the contact center agent 131 may be given 30 seconds to say a response word or phrase while talking to the customer 130 in the audio communication session (e.g., "transfer" as discussed above). If a timeout has occurred in step 216, the process can implement an action based on the timeout in step 218 (if an action is associated with the timeout). For example, the automated non-verbal user message may have the contact center agent say "supervisor" within 30 second to transfer the call to a supervisor. The message may say that the audio communication session will be otherwise transferred to a technical specialist if the contact center agent 131 does not say the word supervisor in the next 30 seconds. In this example, if the contact center agent 131 does not say "supervisor" in the next 30 seconds, the audio communication session is transferred to a technical specialist (may be done with or without the contact center agent's permission) in step 218. After implementing the action (if there is one) in step 218, the process goes to step 202.

Otherwise, if there is not a timeout in step 216, the call/event manager 122 determines, in step 220, if the audio communication session has ended. If the audio communication session has ended in step 220, the process goes back to step 202. Otherwise, if the audio communication session has not ended in step 220, the process goes back to step 212.

FIG. 3 is a flow diagram of a process for sending and receiving non-visual messages in an electronic audio communication session using background sounds/signals. The process of FIG. 3 is illustratively described where an audio communication session is eventually established between the communication endpoint 101A of the customer 130 and the communication endpoint 101N of the contact center agent 131. However, the process of FIG. 3 is not limited to a single audio communication session. For example, the process of FIG. 3 may work with multiple concurrent audio communication sessions, conferenced audio communication sessions, and/or the like between multiple customers 130/contact center agents 131.

The process starts in step 300. The call/event monitor 122 determines, in step 302, if an audio communication session has started/is established. For example, the call/event monitor 122 can determine (e.g., based on a message received from the communication manager 121) that an audio communication session has been established between the communication endpoint 101A of the customer 130 and the communication endpoint 101N of the contact center agent 131. If the audio communication session has not started/been established in step 302, the process of step 302 repeats.

Otherwise, if the audio communication session has started/been established in step 302, the call/event monitor 122 may optionally insert a background sound and/or a signal into the audio communication session between the communication endpoint 101A of the customer 130 and the communication endpoint 101N of the contact center agent 131. The background sound and/or signal can be or may include any sound and/or signal that is inserted into the audio communication that both the customer 130 and the contact center agent 131 can hear. For example, the background signal may be a music stream, a radio stream, a sound (e.g., the sound of waves), a heartbeat sound, white noise, and/or the like.

The call/event monitor 122 waits to detect an event in step 306. The event of step 306 may be any event that relates to the audio communication session between the communication endpoint 101A of the customer 130 and the communication endpoint 101N of the contact center agent 131. The event may be based on any party in the audio communication session, based on any event of the contact center 120 (e.g., a call volume), based on outside events (e.g., a natural disaster), and/or the like. In one embodiment, the detected event 306 may occur before the audio communication session is actually established. The event may be based on one or more rules that can be predefined, administered, learned using Artificial Intelligence (AI), and/or the like.

The event of step 306 may be based on one or more contact center queue(s) 123. For example, when the contact center queue 123 is holding more than a defined number of calls, an event may be generated. In another embodiment, an estimated call wait time (for a new call) may be the detected event.

In one embodiment, a calendar event is detected in step 306. For example, the event may be where the contact center agent 131 has an upcoming break, is at the end of his/her work period, has a secluded meeting, has a schedule task, and/or the like.

The event may be to escalate the audio communication session to a supervisor or technical expert. For example, the call/event manager 122 may determine that the voice of the contact center agent 131 and/or customer 130 is becoming agitated (e.g., by detecting profanity and/or voice stress/inflection) or the call is taking too long and generate an event to notify the contact center agent 131 that the call needs to be transferred to a supervisor or technical expert. Alternatively, the event may be to conference in a supervisor/technical expert based on various factors.

The event may be to transfer the audio communication session to an Interactive Voice Response (IVR) system 124 to better serve the customer 130. For example, the call/event manager 122 may determine that the current contact center agent 131 does not support the product the customer 130 is inquiring about and needs to transfer the call to an IVR system 124 that queries the customer about the correct product.

The event may be where it is determined that the contact center agent 131 needs to send a document to the customer 130. For example, the call/event manager 122 may determine by listening to the voice conversation that the customer 130 needs a copy of a user manual. A response to the event may include sending an email with the manual as an attachment to the customer 130.

If an event is not detected in step 306, the call/event manager 122 determines if the audio communication session has ended in step 308. If the audio communication has ended in step 308, the process goes back to step 302. Otherwise, if the audio communication session has not ended in step 308, the process goes back to step 306 to detect an event.

If an event is detected in step 306, call/event manager 122 changes the inserted background sound and/or signal, and/or inserts a new background sound or signal into the audio communication session in step 310. To convey the occurrence of the event to the contact center agent 131, the call/event manager 122 may change a song in a music stream to a different song, change a genre of music in the music steam (e.g., change from country music to rock music), repeat a song in the music stream, insert a message into a media stream (e.g., insert an disk jockey's voice into a media stream), insert/add a specific sound (e.g., a beep sound), remove a specific sound (e.g., remove white noise or a music stream), change a heartbeat sound, change a frequency of the heartbeat sound, change a level of white noise (e.g., increase the level of added white noise if the customer is becoming agitated), change a sound level (increase/decrease a wave background sound), and/or the like. The above background sounds and/or signals may be used in any combination to identify any event to the contact center agent 131. For example, if the contact center agent 131 hears one beep, this can indicate that the contact center agent needs to transfer the audio communication session to a subject matter expert. If the contact center agent 131 hears two beeps he/she needs to transfer the call to a supervisor.

The call/event manager 122 monitors the audio communication session between the communication endpoint 101A of the customer 130 and the communication endpoint 101N of the contact center agent 131, in step 312, to detect a response to the change in the inserted background sound/signal and/or new background sound/signal. For example, the call/event manager 122 may detect a word or phrase spoken by the contact center agent 131 in the audio communication session between the communication endpoint 101A of the customer 130 and the communication endpoint 101N of the contact center agent 131. For instance, upon hearing two beeps, the contact center agent 131 may respond by saying "I am going to transfer you to my supervisor" (where the word "supervisor" is a keyword). This results in the call being automatically transferred (or based on the contact center agent's approval) to the supervisor.

Alternatively, the call/event manager 122 can detect a response based on the accelerometer 103N. For example, when the contact center agent 131 hears one beep (which indicates that the call is to be transferred to a subject matter expert), the contact center agent 131 can then shake the communication endpoint 101N once to implement the transfer. For example, the contact center agent 131 can say to the customer I am going to transfer you to a subject matter expert and then shake the communication endpoint 101N to transfer the call to the supervisor. This type automation/simplification (described in FIGS. 2-3) allows the contact center agent 131 to implement a suggested call transfer without having to view the display 106N and without having to interrupt the audio conversation with the customer 130 while using a mobile device (communication endpoint 101N). This results in increased functionality of communication endpoint 101N (a mobile smartphone) that was not able to be accomplished previously.

The call/event manager 122 determines, in step 314, if a response to the automated non-verbal user message has been received. If a response is received in step 212, an action is implemented (if there is one) based on the received response in step 316. In some embodiments, step 316 may not exist. For example, as discussed above, the response may be only to acknowledge the automated non-verbal user message and there is no action based on the response. After implementing the action based on the received response in step 316, the process goes to step 302.

Otherwise, if a response is not received, in step 314, the call/event manager 122 determines if a timeout period has been met in step 318. For example, the contact center agent 131 may be given 30 seconds to say a response word or phrase while talking to the customer 130 in the audio communication session (e.g., "transfer" as discussed above). If a timeout has occurred in step 318, the process can implement an action based on the timeout in step 320 (if an action is associated with the timeout). For example, the automated non-verbal user message may have the contact center agent say "supervisor" within 30 second to transfer the call to a supervisor. The message may say that the audio communication session will be otherwise transferred to a technical specialist if the contact center agent 131 does not say the word supervisor in the next 30 seconds. In this example, if the contact center agent 131 does not say "supervisor" in the next 30 seconds, the audio communication session is transferred to a technical specialist (may be done with or without the contact center agent's permission) in step 320. After implementing the action (if there is one) in step 320, the process goes to step 302.

Otherwise, if there is not a timeout in step 318, the call/event manager 122 determines, in step 322, if the audio communication session has ended. If the audio communication session has ended in step 322, the process goes back to step 302. Otherwise, if the audio communication session has not ended in step 322, the process goes back to step 314.

FIG. 4 is a flow diagram of an optional process for flashing a display 106N of a hand-held mobile device (communication endpoint 101N) to convey a message when the hand-held mobile device (communication endpoint 101N) is being held to the contact center agent's ear. The process of FIG. 4 can is an exemplary embodiment that can be used with either FIG. 2 (between steps 208/210) or FIG. 3 (between steps 310/312).

After sending the automated non-visual message in step 204 or changing the inserted background sound/signal and/or inserting a new background sound/signal in step 310, the call/event monitor 122 determines, in step 400, if the communication endpoint 101N is a hand-held mobile device (e.g., a smartphone). If the communication endpoint 101N is not a hand-held mobile device, the process goes to step 210 or step 312.

Otherwise, if the communication endpoint 101N is a hand-held mobile device, the call/event monitor 122 sends, in step 402, a message to flash the display 106N in the communication endpoint 101N. If the contact center agent 131 is using a hand-held mobile device, the contact center agent 131 typically has the hand-held mobile device held up to his/her ear when talking to the customer and cannot easily view the display 106N. By flashing the display 106N, the contact center agent 131 is more likely to determine that there was an event. The process then goes to step 210 or step 312.

While the above examples describe where the processes are used within a contact center 120, the above processes may be used in where there is not a contact center 120. For example, the processes described above may be used for a malicious call functionality. For example, the user may be warned via a vibrator or whisper mode that the caller may be a potential malicious caller. In one embodiment, the system may ask the caller to verify their credentials.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that program the microprocessor to:
monitor an audio communication session, wherein the audio communication session is between a first user of a first communication endpoint and a second user of a second communication endpoint, detect an event that indicates that the audio communication session should be transferred to a third user of a third communication endpoint;
in response to detecting the event, send, to the first communication endpoint, an automated non-visual user message during the audio communication session, wherein the automated non-visual user message requests a confirmation that the audio communication session should be transferred; and
receive a response to the automated non-visual user message, wherein the response confirms that the audio communication session should be transferred, and wherein the response to the automated non-visual user message is based on an accelerometer event in the first communication endpoint.

2. The system of claim 1, wherein the automated non-visual user message causes the first communication endpoint to at least one of: vibrate, vibrate in a defined pattern, and vibrate at one or more defined levels.

3. The system of claim 1, wherein the automated non-visual user message is an audio message that is sent via an audio whisper channel that is only heard by the first user of the first communication endpoint.

4. The system of claim 1, wherein the automated non-visual user message is sent in an audio whisper channel that is only heard by the first user of the first communication endpoint and wherein the automated non-visual user message is at least one of: a changed song in a music stream, a changed genre of music in the music stream, a repeated song in the music stream, a message inserted into the music stream, a specific sound, a removed sound, a heartbeat sound, a beep, a changed frequency of the heartbeat sound, a changed level of white noise, a type of white noise, and a changed sound level.

5. The system of claim 1, wherein the accelerometer event comprises detecting one or more shakes of the first communication endpoint by the first user.

6. The system of claim 1, wherein the response to the automated non-visual user message further comprises a spoken word or phrase that is said by the first user of the first communication endpoint during the audio communication session with the second user of the second communication endpoint.

7. The system of claim 1, wherein the detected event is at least one of:
a contact center queue wait time event;
a contact center queue number of held calls event;
a calendar event;
an event to escalate the audio communication session to a supervisor or technical expert;
an event to conference in the supervisor or technical specialist into the audio communication session;
an event to transfer the audio communication session to an Interactive Voice Response (IVR) system;
an upcoming agent break event;
an end of work event;
an event to send a document to the first user;
an event to send an email; and
an event to play contents of a previous email.

8. The system of claim 1, further comprising:
determining if the first communication endpoint is a hand-held mobile device; and
in response to determining that the first user is looking at a screen of the hand-held mobile device, sending a message to flash the screen of the hand-held mobile device.

9. A method comprising: during an audio communication session, wherein the audio communication session is between a first user of a first communication endpoint and a second user of a second communication endpoint, detecting, an event that indicates that the audio communication session should be transferred to a third user of a third communication endpoint;
sending, by a microprocessor, to the first communication endpoint, an automated non-visual user message during the audio communication session, wherein the automated non-visual user message requests a confirmation that the audio communication session should be transferred; and
receiving, by the microprocessor, a response to the automated non-visual user message, wherein the response confirms that the audio communication session should be transferred, and wherein the response to the automated non-visual user message is an accelerometer event in the first communication endpoint.

10. The method of claim 9, wherein the automated non-visual user message causes the first communication endpoint to at least one of:
vibrate, vibrate in a defined pattern, and vibrate at one or more defined levels.

11. The method of claim 9, wherein the automated non-visual user message is an audio message that is sent via an audio whisper channel that is only heard by the first user of the first communication endpoint.

12. The method of claim 9, wherein the automated non-visual user message is sent in an audio whisper channel that is only heard by the first user of the first communication endpoint and wherein the automated non-visual user message is at least one of: a changed song in a music stream, a changed genre of music in the music stream, a repeated song in the music stream, a message inserted into the music stream, a specific sound, a removed sound, a heartbeat sound, a beep, a changed frequency of the heartbeat sound, a changed level of white noise, a type of white noise, and a changed sound level.

13. The method of claim 9, wherein the response to the automated non-visual user message is further comprises a spoken word or phrase that is said by the first user of the first communication endpoint during the audio communication session with the second user of the second communication endpoint.

14. A non-transitory computer-readable medium comprising processor-executable instructions, the processor-executable instructions comprising:
   instructions configured to establish an audio communication session between a first user of a first communication endpoint and a second user of a second communication endpoint;
   instructions configured to monitor the audio communication session, to detect an event that indicates that the audio communication session should be transferred to a third user of a third communication endpoint;
   in response to detecting the event, instructions configured to send to the first communication endpoint, an automated non-visual user message during the audio communication session, wherein the automated non-visual user message requests a confirmation that the audio communication session should be transferred, wherein the confirmation comprises an accelerometer event in the first communication endpoint.

15. The non-transitory computer-readable medium of claim 14, wherein the automated non-visual user message comprises an inserted background sound or signal.

16. The non-transitory computer-readable medium of claim 14, wherein the automated non-visual user message comprises inserting a new background sound or signal in the audio communication session.

17. The non-transitory computer-readable medium of claim 14, wherein the automated non-visual user message comprises at least one of: a changed song in a music stream, a changed genre of music in the music stream, a repeated song in the music stream, a message inserted into the music stream, a specific sound, a removed sound, a heartbeat sound, a changed frequency of the heartbeat sound, a changed level of white noise, a type of white noise, and a changed sound level.

18. The non-transitory computer-readable medium of claim 14, wherein the confirmation further comprises
   a spoken word or phrase that is said by the first user of the first communication endpoint during the audio communication session with the second user of the second communication endpoint.

* * * * *